(12) United States Patent
Reimers

(10) Patent No.: US 7,581,748 B2
(45) Date of Patent: Sep. 1, 2009

(54) POWER ASSISTED GOLF BAG CART

(75) Inventor: Eric W. Reimers, Missoula, MT (US)

(73) Assignee: Sun Mountain Sports, Inc., Missoula, MT (US)

(*) Notice: Subject to any disclaimer, the term of this patent is extended or adjusted under 35 U.S.C. 154(b) by 376 days.

(21) Appl. No.: 11/460,477

(22) Filed: Jul. 27, 2006

(65) Prior Publication Data

US 2007/0096415 A1 May 3, 2007

Related U.S. Application Data

(60) Provisional application No. 60/703,159, filed on Jul. 27, 2005.

(51) Int. Cl.
*B62B 1/00* (2006.01)

(52) U.S. Cl. .................. 280/651; 280/654; 280/DIG. 6

(58) Field of Classification Search ................ 180/19.2, 180/214, 65.5, 19.1, 65.1; 280/651, 654, 280/652, 655, 645, 646, 47.17, 47.26, 47.315, 280/DIG. 6, DIG. 5, 647, 639; 248/96, 98, 248/95, 97

See application file for complete search history.

(56) References Cited

U.S. PATENT DOCUMENTS

| | | | | |
|---|---|---|---|---|
| 2,962,106 A | * | 11/1960 | Burnside et al. | 180/19.3 |
| 5,749,424 A | * | 5/1998 | Reimers | 180/19.2 |
| 6,698,789 B2 | * | 3/2004 | Reimers et al. | 280/651 |
| 7,128,333 B2 | * | 10/2006 | Reimers et al. | 280/651 |
| 2007/0131465 A1 | * | 6/2007 | Garceau | 180/65.5 |

* cited by examiner

*Primary Examiner*—Hau V Phan
(74) *Attorney, Agent, or Firm*—Michael J. Hughes

(57) ABSTRACT

A golf bag cart system (10) is provided for supporting and transporting a golf bag (12). The cart (10) is a three wheel push cart with a front disc motor (108) mounted in the front wheel (26). Recurve tubes (82, 84) support the golf bag (12) with ample access to pockets and provide a battery cradle (90) situated to improve traction. An offset bracket (66) provides and improved handle pivot (68). Grasping arms (96, 98) releasably grip the golf bag and are adjustable. Speed and motor controls (124) including preset distance controls (134, 136 and 138) provide superior control of motion for the user. The handle (64) is provided with a dashboard console (164) including numerous useful accessories.

2 Claims, 9 Drawing Sheets

POWER ASSISTED GOLF BAG CART

This is a non-provisional application which claims priority from a provisional patent application Ser. No. 60/703,159, filed 27 Jul. 2005 to the same inventor. The application is a Continuation-In-Part of copending Ser. No. 10/788,580 by the same inventor.

TECHNICAL FIELD

The present invention relates generally to carts used in transporting sports equipment, and more particularly to golf carts for transporting golf bags.

BACKGROUND ART

Golf is a sport which its practitioners often take very seriously. In particular, golfers may have a large selection of clubs and accessories to use for every foreseeable occasion, and consequently, the golf bag and its collection of clubs and accessories may become heavy and cumbersome to carry around the golf course. One answer to this problem has been the golf bag cart, to which the bag can be attached, thus relieving the golfer of the burden of carrying the clubs upon his or her shoulders. The golf bag cart is to be used by a walking golfer, distinguishing it form a typical riding golf cart, where both the golfer and the clubs are propelled around the course.

A golf bag cart ideally has several qualities which make it well suited for its purpose. One such quality is stability, since the cart will be expected to be used in uneven terrain and in varying weather conditions. To aid in stability, it is thus desirable that the cart have tires and wheels of a sufficient diameter that the wheels do not become stuck in small ruts and mud puddles. The cart should have a sufficiently wide wheel base that it does not easily tip over when on sloped terrain, or when buffeted by winds. It must additionally be large enough in its frame that a fair sized golf bag can be easily secured to it, usually at top and bottom, thus implying a certain minimum length between the wheels and the upper handle.

The inventor's own prior invention, as shown and described in U.S. Pat. No. 6,698,789 has addressed and solved most of the problems associated with three-wheeled push type golf bag carts. The SPEED CART® models of Sun Mountain Sports, Inc. has become the industry standard for this type of product. Yet even that invention leaves room for developments and improvements. In particular, versions of the prior invention adaptable for power assistance and having numerous improvements are desirable.

There is thus still a great need for improved features in a golf bag cart.

DISCLOSURE OF INVENTION

Accordingly, it is an object of the present invention to provide a golf bag cart which includes numerous improved features and yet collapses to a compact configuration.

Another object of the invention is to provide a cart which is provided with a power assist capability to permit the golfer to use it on the course without providing motive power to the cart.

A further object of the present invention is to provide a cart which grasps and holds a golf bag without the need of straps or other fastenable restraining means.

Yet another object of the present invention is to provide an improved mechanism for restraining a scorecard on a cart.

An additional object of the present invention is provide a golf bag push cart with an offset handle to permit compact folding with the handle coming to rest above the rear wheels.

Still another object of the present invention is to provide a bag support cradle which supports the bag at a position offset from the center portions of the frame, in order to provide improved access to pockets on the bag and to provide room for a battery.

Yet another object of the invention to provide a powered golf bag cart which is relatively light in weight for easy lifting and handling when folded into compact storage mode.

A further object of the invention is to provide a powered cart which may be easily used without use of the power component, as in the case of a non-functioning battery.

An additional object of the invention is to provide a power-assisted golf bag cart which may be controlled from the cart itself or by remote control.

Briefly, one preferred embodiment of the present invention is a golf bag cart adapted for use in a use mode (expanded configuration) or a storage mode (collapsed configuration). The golf bag cart includes a propulsion system including a front wheel and a pair of rear wheels, all of which may be pivoted into the collapsed configuration. A bag support sub-system, including a bag cradle frame and grasping arms, receives and carries a golf bag during use. A control sub-system provides power assistance to moving the cart and includes a front wheel drive motor, a battery, a control panel and wiring circuitry. An accessory group provides a variety of comfort and convenience enhancing components. The golf bag cart is adapted for use by golfers who wish to walk while the golf bag and clubs are transported by a cart.

An advantage of the present invention is it provides a power assisted golf bag cart which is relatively lightweight and collapses into a compact form for transport and storage.

Another advantage of the invention is it quickly and easily collapses into a compact shape for storage or transportation.

An additional advantage of the invention is that it may be used as a standard push-cart when the user desires, or when the battery power is unavailable.

A further advantage of the invention is that it may be set to traverse set distances so it may travel unattended for desired intervals.

An additional advantage is that it includes numerous convenience accessories for the golfer, dealing with a large number of common needs.

Yet another advantage of the invention is that embedded disc motor in the front wheel is protected from impurities and debris, provides superior control front wheel drive and draws minimal amperage during use, increasing battery life.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
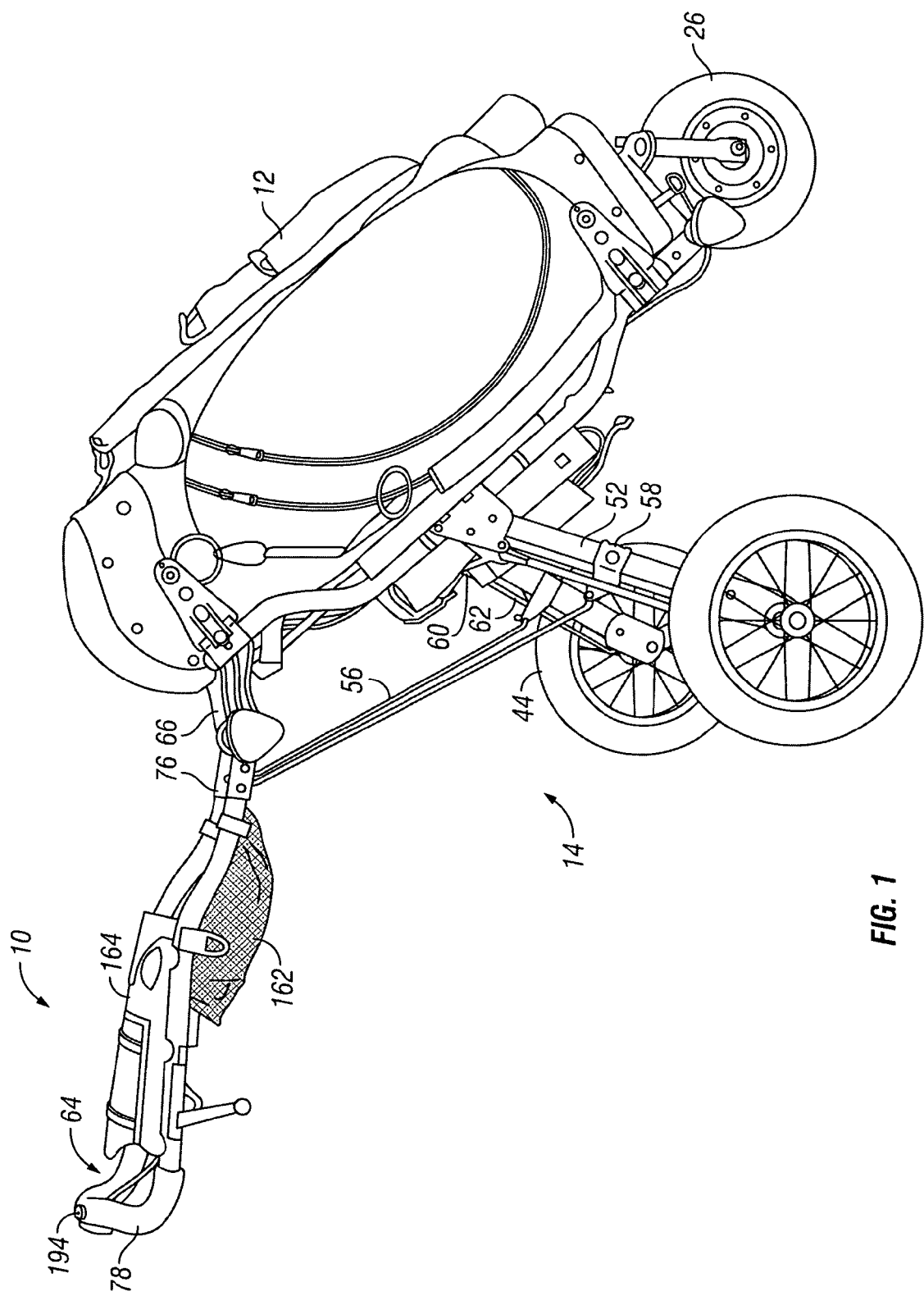
FIG. 1 is a side perspective view of the golf bag cart in use mode (expanded configuration, showing a golf bag thereon.

A preferred embodiment of the present invention is a collapsible power-assisted golf bag push golf cart. As illustrated in the various illustrations of the drawing herein, a form of this preferred embodiment of the inventive golf bag cart system is depicted and referred to by the general reference character 10. The cart 10 is adapted to carry and support any of a wide variety of golf bags 12 which will contain golf clubs, balls and other golfing accessories.

Figure 2:
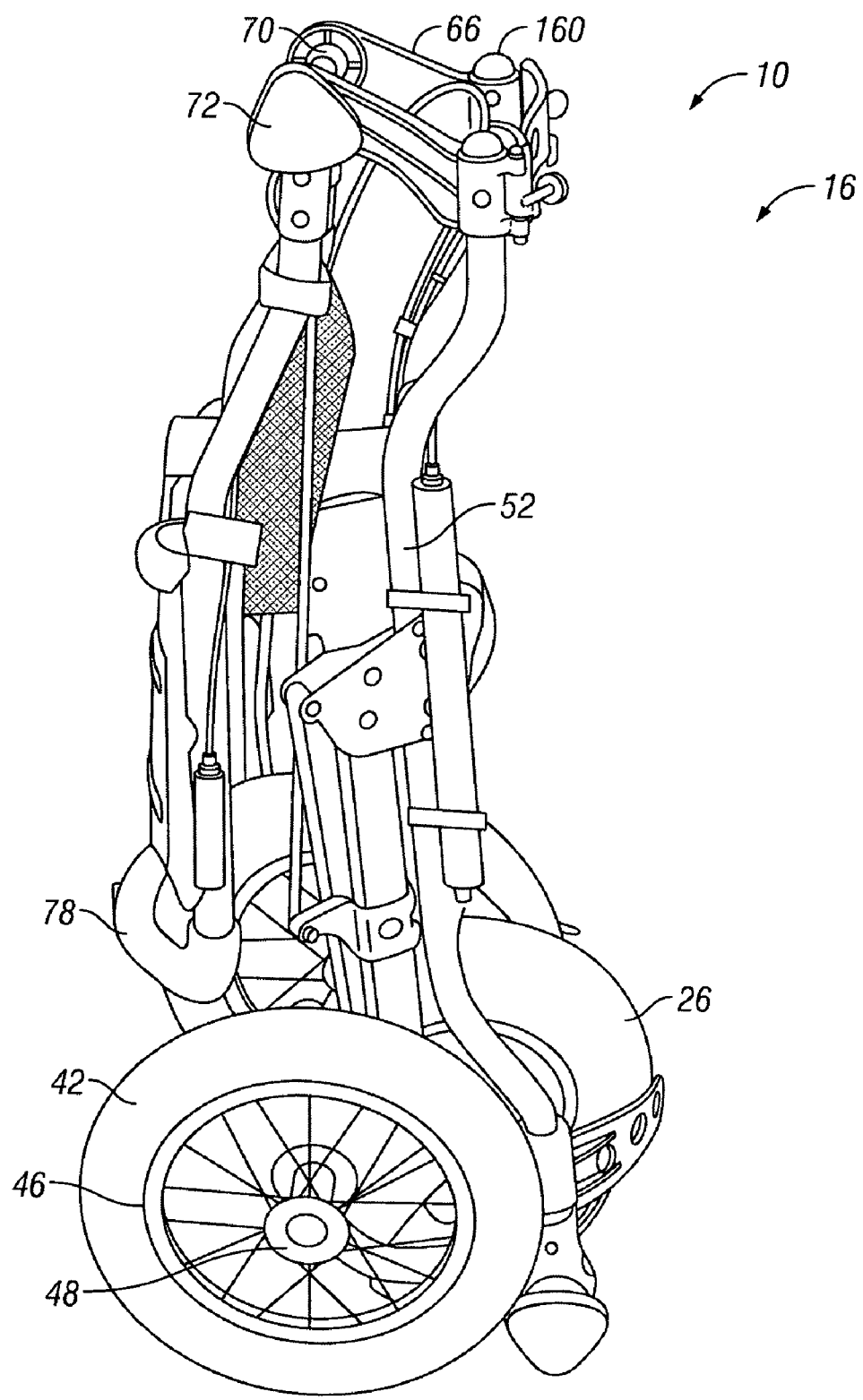
FIG. 2 is a side perspective view of the golf bag cart in storage mode (collapsed configuration)
Figure 3:
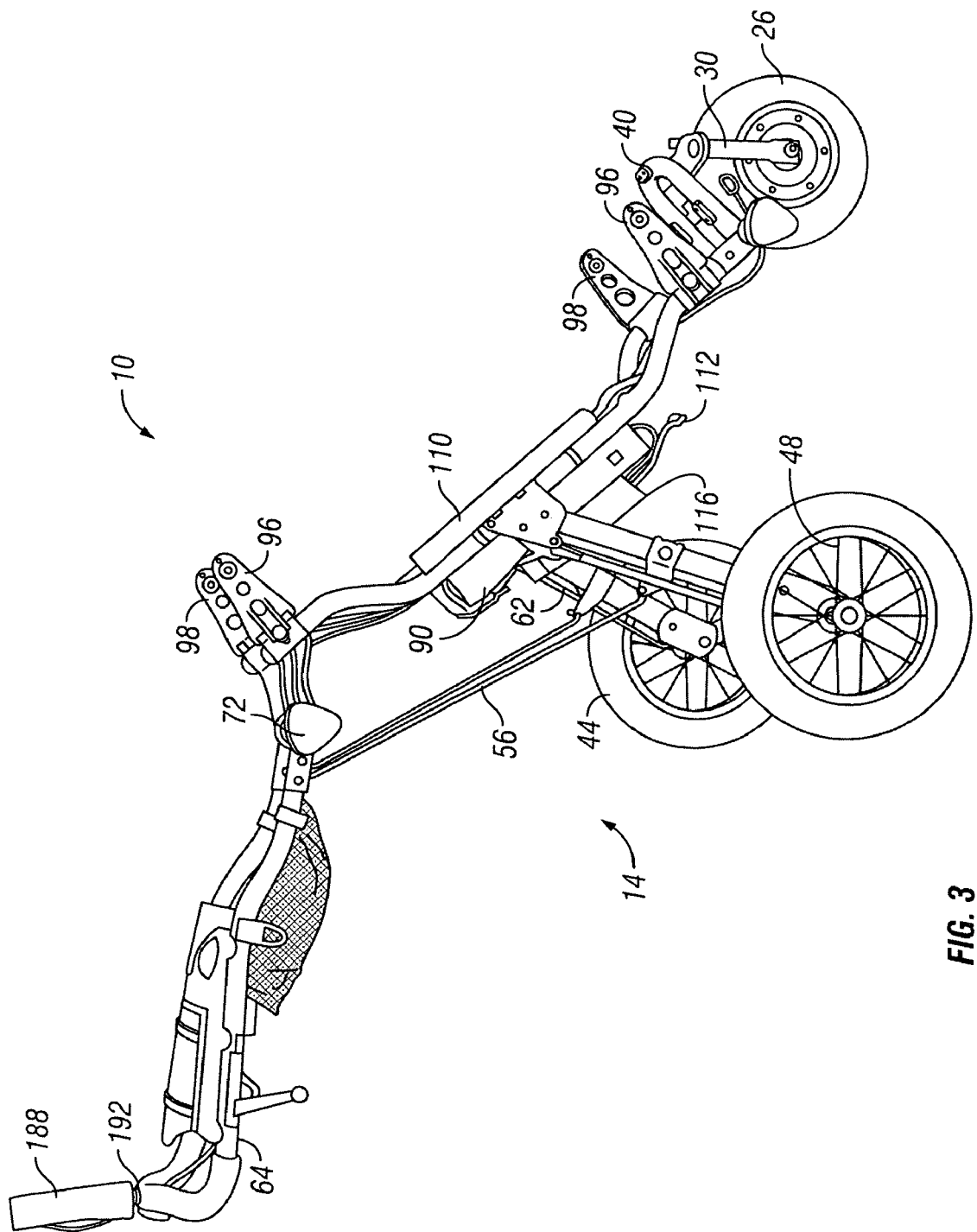
FIG. 3 is a view similar to that of FIG. 1, without the golf bag.

The golf bag cart 10 is adapted to have two configuration modes. The use mode 14, also referred to as the expanded or extended mode, is shown in FIGS. 1 and 3 particularly. In this mode, the cart 10 is set up to support a bag 12 (see FIG. 1) during use on or around a golf course. The cart 10 is also utilized in a storage mode 16, also known as a collapsed mode 16, as shown in FIG. 2. In this orientation the cart 10 is very compact and easily fits into the trunks of most automobiles for transport, and has a relatively small standing footprint for storage. Converting from use mode 14 to storage mode 16 is a matter of a few moments effort, as described hereinafter.

The golf bag cart 10 of the present invention may be considered to be a system including several subsystems. The principal subsystems are a propulsion subsystem 18, a bag support subsystem 20, a control subsystem 22 and an accessories subsystem 24 (actually a loosely grouped collection of useful doo-dads). It is convenient to describe the invention in terms of these aspects.

The propulsion subsystem 18 includes the various components which allow the cart 10 to be easily pushed (or driven by the control subsystem 22) over a variety of terrain and with minimal power expenditure, either by the golfer or the power assistance. Most of the components in the propulsion subsystem 18 are similar or identical to those shown and described in the Speed Cart U.S. Pat. No. 6,689,789 (referred to as the '789 patent) of the same inventor, so will be addressed in cursory fashion herein.

Figure 4:
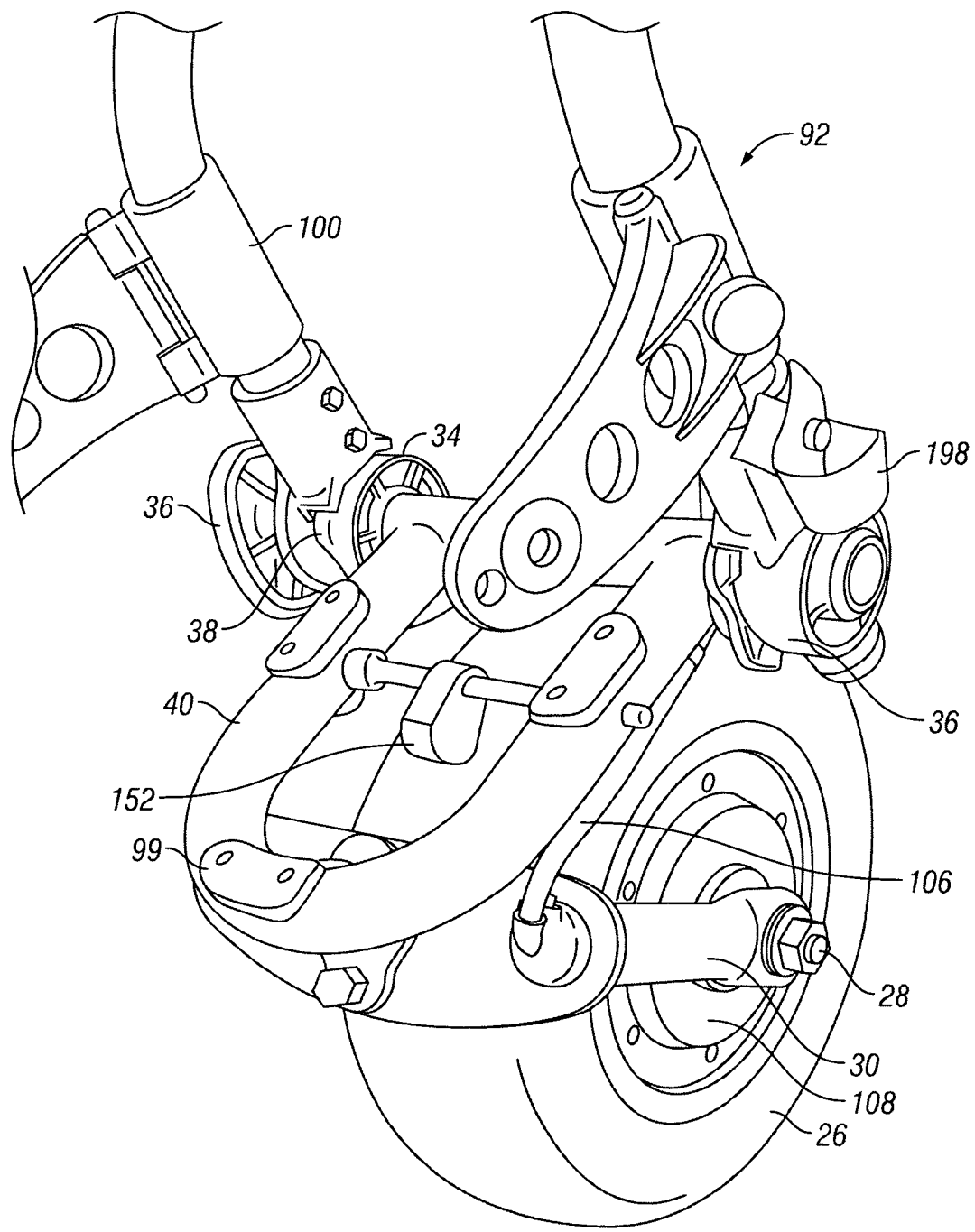
FIG. 4 is an upper right detailed view of the front wheel portion of the invention.

The propulsion subsystem 18 includes a front wheel 26 which is supported on a front axle 28 carried on a front fork 30, as particularly illustrated in FIG. 4. The entire front wheel structure is supported on a front pivot 32 so it may extend forward and downward in the use mode 14 or fold upward and backward in the storage mode 16. The degree of rotation and position of the front wheel is controlled by a front pivot lock mechanism 34.

Significant differences in the structure of this structure from the '789 patent are in that the front wheel 26 is smaller diameter and wider (to accommodate the power assist features) and a different front pivot lock 34 is provided. In the present invention the front wheel 26 is really only intended to function in two positions, unlike the adjustable wide range of positions in the prior version. Accordingly, the front pivot lock 34, while remaining a tooth lock (gear lock) with a tightening lock knob 36, is provided with discreet rotational positioning 38. This is accomplished by providing very broad teeth and gear positions so the lock 34 can only be effectively tightened in the two operational positions.

A front/bottom bag rest 40 is formed by the upper surface of the front fork 30 structure, as described further in connection with the bag support subsystem 20.

Figure 5:
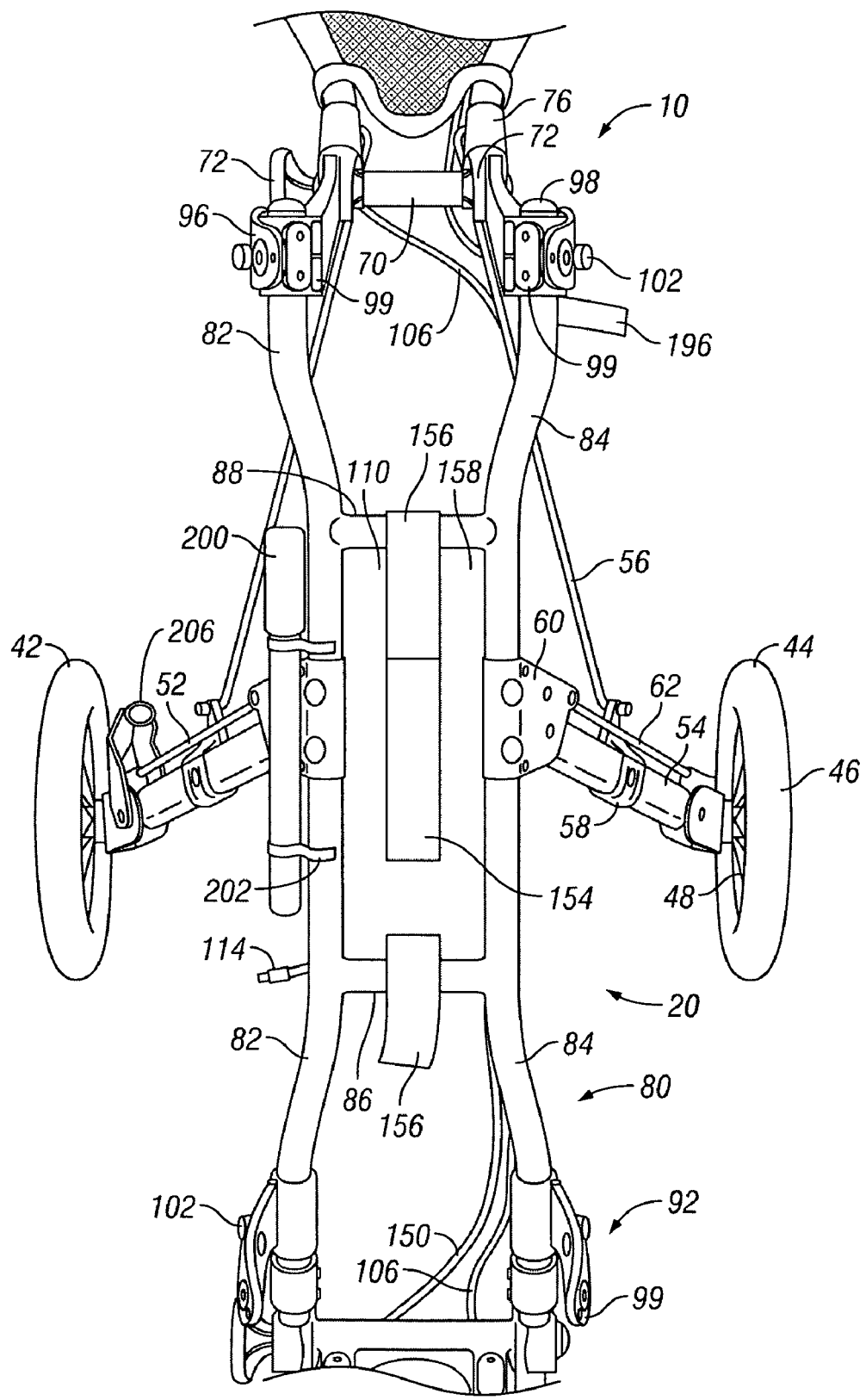
FIG. 5 is a top detailed view of the bag cradle frame portion of the invention.

The propulsion subsystem further includes a left rear wheel 42 and a corresponding right rear wheel 44, particularly seen in FIGS. 3 and 5. The rear wheels 42 and 44 are substantially similar and each includes a rear tire 46, on a spoked hub wheel frame 48, mounted on a rear axle 50. A left pivot frame 52 and a right pivot frame 54 support the respective wheels. A pair of link rods 56 pivotally connect to adjustable link connectors 58 mounted on the pivot frame members 52 and 54. The pivot frames mate with hinge brackets 60, as do parallelogram rods 62 as described in the '789 patent.

At the upper end of the link rods, a handle 64 is provided to activate the folding structure and also to provide a location from which the golfer can control the movement of the cart 10. The handle 64 is attached to an offset bracket 66, as particularly illustrated in FIGS. 2 and 6. The handle 64 is formed by a tube bent to a shape as described in the '789 patent which connects at its lower ends to the offset bracket 66 at a handle pivot 68 with a handle axle 70. A handle pivot lock 72 is provided to secure the position of the handle 64 in the proper rotational position. The handle pivot lock 72 is a tooth lock 74 provided with a tightening knob 76. A significant plurality of teeth are provided in order to allow the handle 64 to be locked in a wide range of positions in order to accommodate the height and comfort of the user. Link rod brackets 76 on the handle 64 receive the upper ends of the link rods 56 in a pivotal fashion, as described in the '789 patent. The handle 64 is provided with a cushioned grip 78 for the comfort of the user.

The offset bracket 66 extends the distance between the handle axle 70 and the rear tires 50, of particular relevance in the storage mode 16, such that the handle 64 is above the tires 50 is storage mode 16, rather than overlapping, as shown in FIG. 2. This reduces the folded cross section and facilitates storage.

The golf bag support subsystem 20 is significantly altered from that of the '789 patent, is particularly illustrated in FIGS. 3, 4, 5 and 6 and is described herein in greater detail. The major component of the bag support subsystem 20 is a bag cradle frame 80 adapted to receive and support the golf bag 12 in a location and orientation convenient to the user, during use mode 14. The bag support frame 80 includes a left recurve tube 82 and a corresponding right recurve tube 84 joined and separated by a lower cross member 86 and an upper cross member 88. A battery cradle 90, situated intermediate the lower and upper cross members, also spans the recurve tubes.

The recurve tubes 82 and 84 are doubly bent so that the ends extend upward from the wheels while the center portion is closer to the wheels. The golf bag 12 is supported at the ends of the tubes at a bag bottom support 92 and a bag top support 94, respectively. Each of the bag bottom support 92 and bag top support 94 is provided with a left grasping arm 96 and a right grasping arm 98. A plurality of bumpers 99 may also be provided in order to cushion the locations where the bag 12 abuts the bag cradle frame 80. Each of the left grasping arms 96 and the right grasping arms 98 is a somewhat flexible member attached to the respective recurve tube by an arm pivot hinge 100 (see FIGS. 4 and 6). A tension set screw 102 on each permits the arms to be set at a desired degree of opening to accommodate the particular golf bag 12 with which the cart 10 is adapted for use. An optional restraint 104

(not shown) may be provided in the form of an elastic cord or the like to extend around the bag and hold it in place, but the elasticity of the arms 96 and 98 and the adjustability of these arms acts to frictionally hold the bag in position to the extent that no further restraint is necessary.

Figure 7:
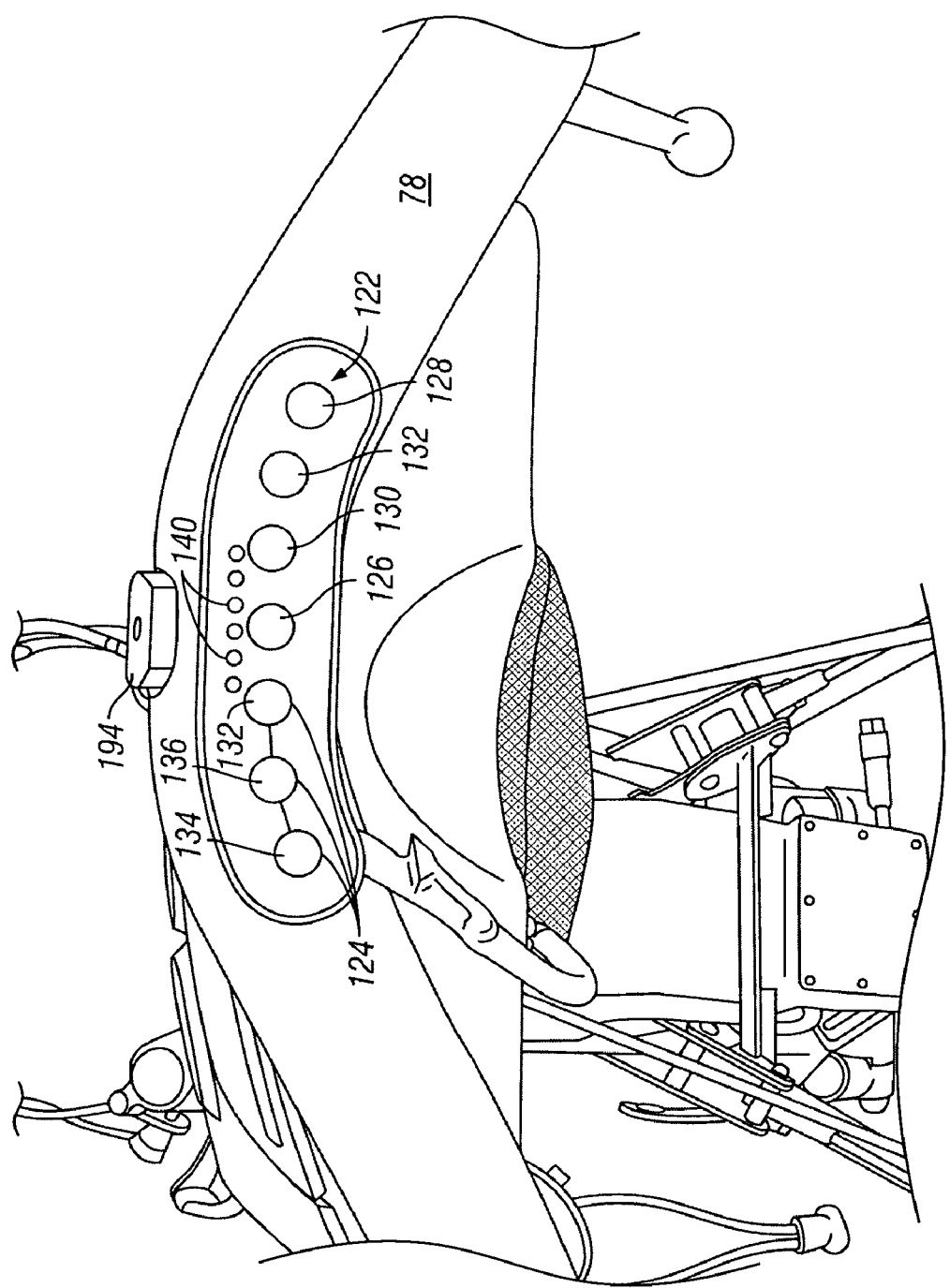
FIG. 7 is a close up view of the control panel portion of the invention.

The control subsystem 22 is a substantially new innovation from the '789 patent and is described herein in more detail, with the majority of the components being illustrated in FIGS. 4, 5 and 7. The control subsystem 22 provides and controls the power assisted nature of the cart 10. An array of electrical wiring 106 distributes electrical power and control signals throughout the subsystem 22.

A principal component of the control subsystem 22, and the propulsion subsystem 18, as well, is a front disc motor 108 which mounts within the hub of the front wheel 26 and provides motive power thereto. The front disc motor 108 is intended to rotate in a single direction (forward) only for simplicity, as the cart 10 may be manually controlled for reverse transit. The disc motor 108 is a sealed unit (see FIG. 4), protected from debris, and is relatively heavy, thus balancing the cart 10 forward and improving traction. Traction and balance is also provided by a battery 110 which is mounted in the battery cradle 90 (see FIGS. 3, 5 and 6). The battery 110 is the source of the greatest weight component in the cart 10. By situating the battery 110 in the center of the cradle frame 80, and below the bag 12, the center of mass of the cart 10 is moved down and forward, minimizing the potential of backtipping toward the handle 64.

The electrical power for the system is provided by the battery 110. A battery connector 112 extends outward from the battery 110. The snap fit connector 112 is adapted to mate with a motor connector 114 which delivers power to the motor through a power distribution box 116 (see FIG. 6) mounted on the base of the battery cradle 90 electrically intermediate the motor connector 114 and motor 120 through the wiring 106. An AC charger 118 is also provided as part of the overall system. This AC charger 118 connects to the battery connector 112 by way of a charger connector 120 so the battery 110 can be recharged between uses. The charging may be accomplished either in situ or the battery 110 may be removed from the battery cradle 90 for the charging process.

The operation of the drive motor 108 is, in the preferred embodiment 10, controlled by the user from the cart itself. A control panel 122 as illustrated in FIG. 7 is provided on the handle 64 at the extreme upper end within the cushioned handle grip 78 area. The control panel is an electronic component connected via the wiring 106 to the power distribution box 116. The control panel 122 includes an array of selector buttons 124, each of which is a push type.

The selector button array 124 includes a power on/off button 126 which activates the circuitry an enables the other controls. A stop/go button 128 is provided to manually activate and deactivate the front disc motor 108, which causes the cart to move forward. A speed up button 130 allows the speed of the rotation (and the cart) to be incrementally increased with each depression. Similarly, a slow down button 132 decreases speed incrementally with each push. The overall speed of operation can be adjusted to a comfortable walking speed by the user, operating the speed up 130 and slow down 132 buttons. The speed selection is retained in memory by the power distribution box 116 circuitry so the same speed selection is activated the next time the go control 128 is activated. The cart 10 is also provided with three distinct distance settings to permit the user to send the cart on its own for a pre-selected distance. These include a 15 yard button 134, a 30 yard button 136 and a 60 yard button 138. Each of these buttons causes the cart to activate and move forward approximately the indicated distance over normal terrain with typical traction conditions.

The control panel further includes a battery level light array 140 which indicates the remaining charge level of the battery 110. For the type of 24 volt battery 110 utilized, the charge is ordinarily sufficient for at least 18 holes of use and is ordinarily expected to permit 27 holes of use, in order to have a margin to permit 18 holes of use over more difficult terrain. The cart 10 is also fully capable of being easily used in manual mode, so that the user is not stranded when battery power is exhausted.

Figure 8:
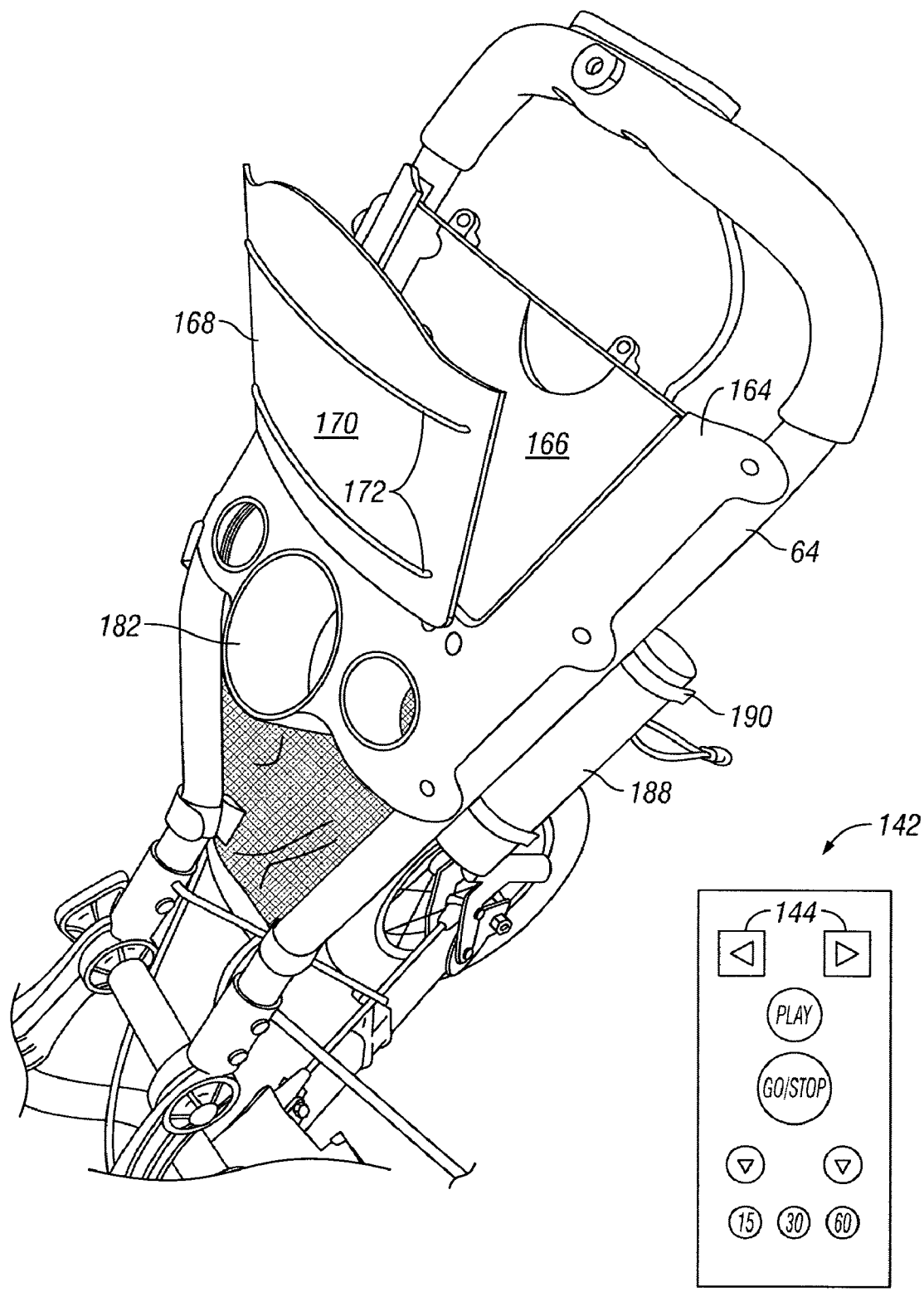
FIG. 8 is a close up view of the handle accessories portion of the invention.

Although not a part of the initial commercial implementation (the Sun Mountain Speed Cart® eCart™) it is also envisioned that a remotely controlled model will be provided. For this embodiment, an optional remote control device 142, see inset in FIG. 8) is envisioned which will permit the remote user to control the motion of the cart from a distance, via radio or infrared signaling. In order to facilitate the remote applications it is necessary to implement steering capability (provided manually in the preferred cart 10). For this reason, in addition to the selector buttons 124 present on the control panel 122, the remote control 142 will also include directional steering control buttons 144. The mounting structure for the front wheel 34 will be modified to permit lateral pivoting (not needed in the basic model) and a steering solenoid mechanism 146 is envisioned to turn the front wheel 134 from side to side in order to allow remote steering control. This will be similar to that shown in the inventor's prior U.S. Pat. No. 5,899,284.

Figure 9:
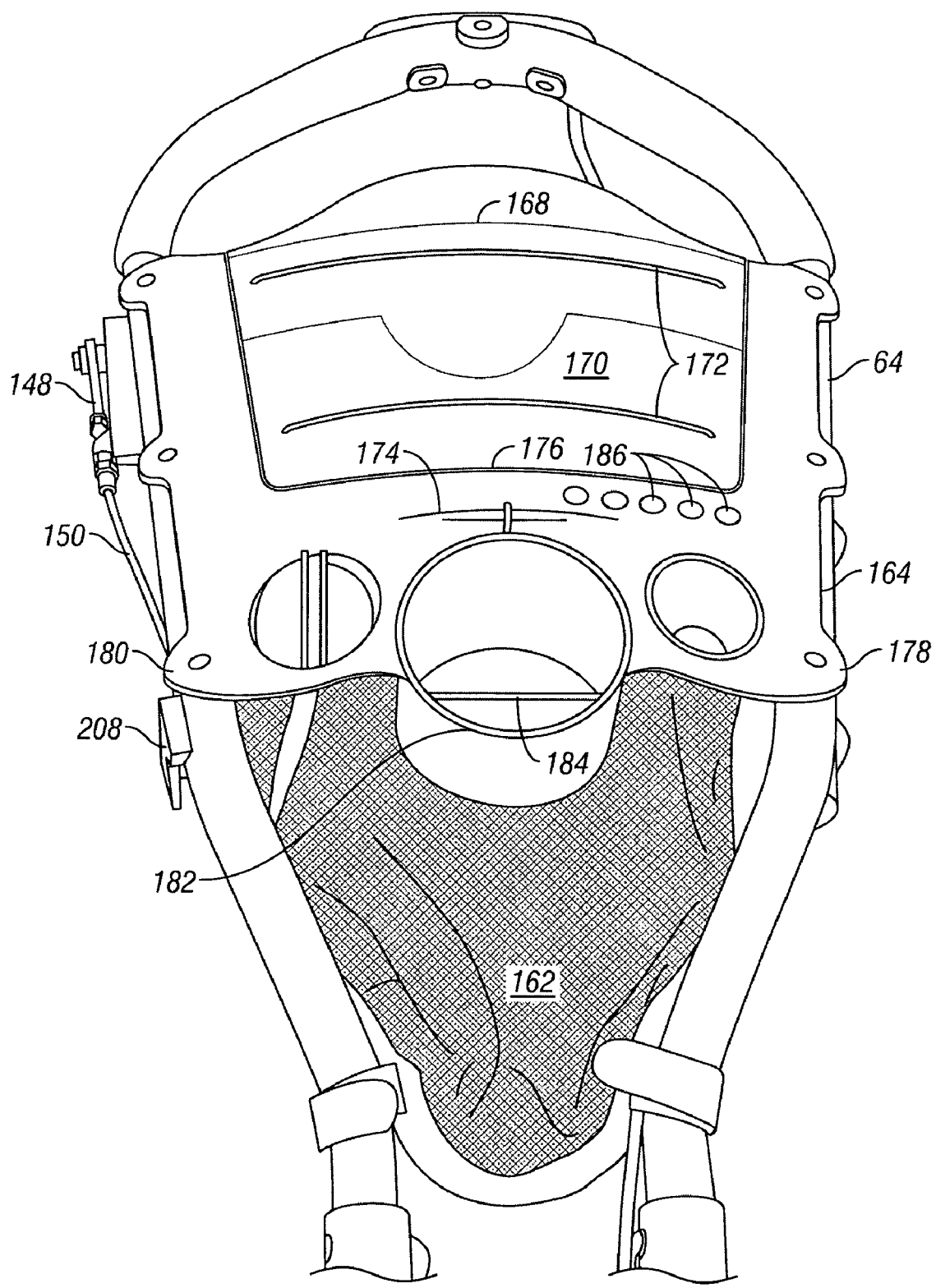
FIG. 9 is another close up view of the handle accessories portion of the invention.

Although not an electronic component, the cart system 10 is also provided with control in the nature of a manual brake. The manual brake control 148 is situated on the handle 64 convenient to the user and is attached to a brake cable 150 (see FIG. 9). In the preferred embodiment 10, a claw brake 152 (see FIG. 4) is provided to engage the front wheel 26 and effectively prevent rotation thereof. It is noted that the power provided by the motor 108 will ordinarily not be sufficient to overcome the restraining force of the claw brake 152, so the user will have to disengage the manual brake 148 to permit the cart to roll forward.

The accessory subsystem 24 is a convenience label for a variety of improvements and accessories provided to enhance the golfer's experience. The preferred embodiment 10 includes a wide variety of such enhancements which are described herein. Most of these may be seen in the illustrations of FIGS. 8 and 9.

One area of accessories, shown in FIG. 5, particularly, relates to the battery 100 where a battery pouch 154 is provided to enclose, protect and permit easy handling of the battery 100. In addition to a grasping handle the battery pouch 154 includes securing straps 156 (Velcro™) to facilitate attachment and securing within the battery cradle 90 and a flap 158 to permit the battery 110 to be removed when desired.

Figure 6:
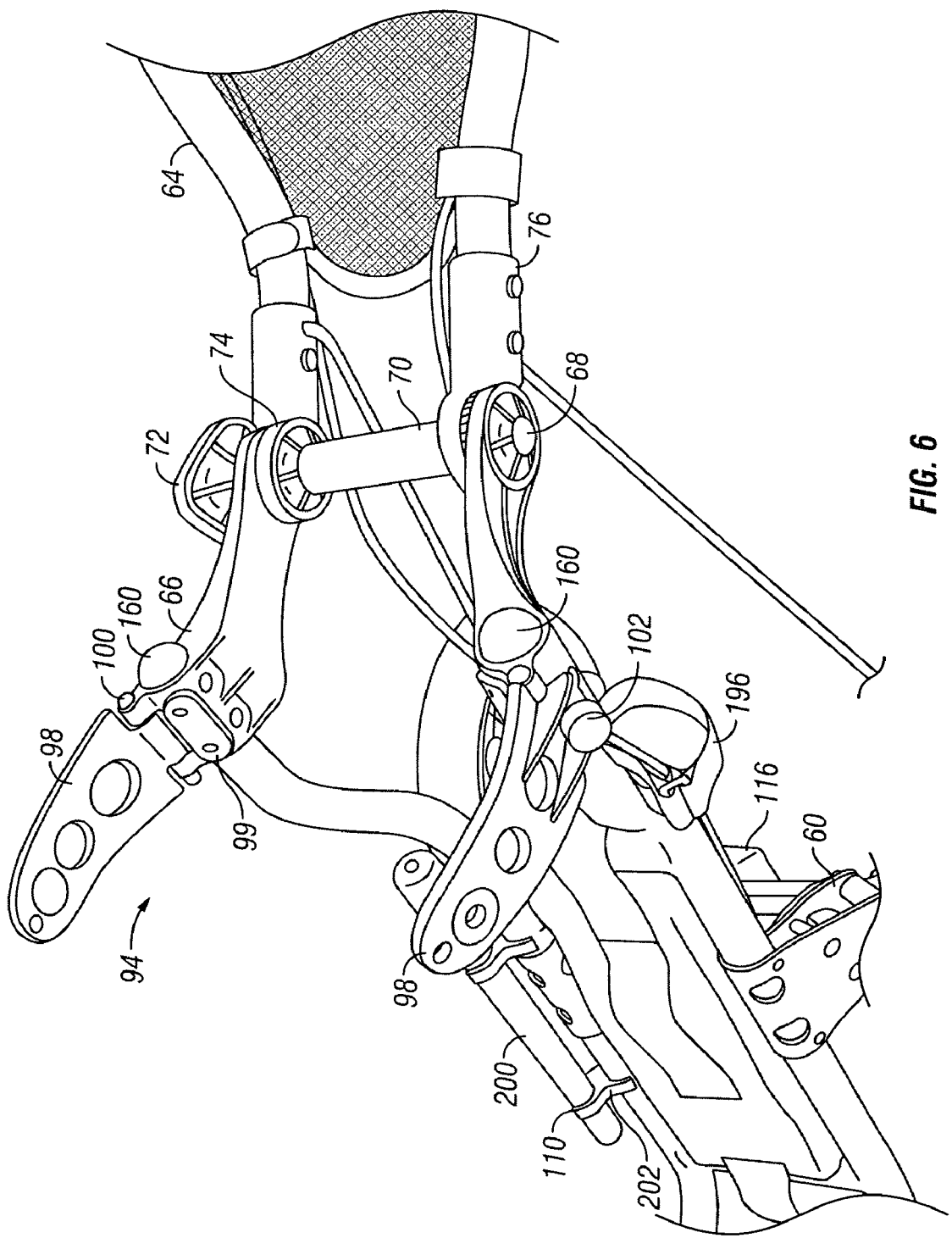
FIG. 6 is a detailed view of the upper bag support and handle axle portions of the invention.

At each end of the respective recurve tubes 82 and 84 and any other exposed structural members, plastic tube caps 160 are provided to add cushioning and aesthetic touches, as shown in FIG. 6.

A large number of user enjoyment enhancements are mounted within the curve of the handle 64. A net basket 162 is provided to facilitate temporary storage of various small items to which the golfer desires ready access (e.g. green repair tools and the like). A component which is referred to as a dashboard console 164 is mounted on the handle 64 and provides numerous functions. The console 164 includes a padded interior compartment 166 bounded by a hinged cover 168. In the preferred embodiment 10, the hinged cover 168 is translucent and has a writing surface, designated as a scorecard panel 170 on the outer surface. Scorecard restraints 172 in the form of elastic cords (Bungee type) extend across the scorecard panel to capture a scorecard (or other paper-type item) in a relatively secure and windproof manner while allowing easy access, removal and insertion. A pencil slot 174 with a pencil restraint 176 (another elastic cord) is situated on the dashboard console 164 adjacent to the hinged cover 168.

Additional features of the dashboard console 164 include a ball holder depression 178 and a ball marking recess 180. The ball marking recess 180 is a ball shaped formation, open to the bottom and provided with an open slot across the top. A ball may be inserted from beneath and held in position while markings are applied (usually with a permanent marker) through the slot. The markings are used by golfers to differentiate their own golf balls from those of others to permit positive identification (and to avoid penalties associated with misidentification.

A drink holder depression 182 is also provided in the dashboard console 164. The drink holder depression 182 has sufficient diameter and depth to receive a very wide variety of liquid containers, form bottles to cans to cups. A drink restraint 184 is provided across the drink holder depression 182 in order to hold the container in place. The drink restraint 184 is an elastic cord strategically mounted offset from the diameter of the depression 182 in order to accommodate containers of varying thicknesses. For narrow containers, such as bottles, the container is inserted in the narrow portion of the depression 182 with the drink restraint 184 holding it against the near rim. Larger containers may be mounted toward the wide portion, with similar restraint. In this manner the varying containers are provided with flexible retraining force, minimizing spills.

A plurality of tee capture apertures 186 is also provided on the upper surface of the dashboard console 164. Each tee capture aperture 186 is adapted to slidably receive and restrain a typical golf tee, in a position for ready access by the golfer.

An umbrella holder 188 is releasably held in place along the side of the handle 64 by a pair of holder brackets 190, into which the umbrella holder 188 snap fits. The umbrella holder 188 is effectively a hollow tube with a threaded screw 192 extending from one longitudinal end to engage holder threads 194 in the handle 64. The umbrella holder 188 then extends vertically from the handle 64 (See FIG. 3) to receive and support a typical umbrella in an open configuration. This provides rain and/or ultraviolet ray protection to the golfer and the upper end of the golf bag 12 during use, while leaving the golfer's hands free.

A tire pump 200 (see FIGS. 5 and 6) is provided to be stored in tire pump brackets 202 mounted along one of the recurve tubes. The tire pump 200 may be used to refill the various tires or for other air supply purposes.

A seat bracket 204 (see FIG. 5) is provided adjacent to one of the rear tires 46. An optional seat 206 (not shown) may be inserted into the seat bracket 204, allowing the golfer to obtain a brief respite during a round.

Various other hanger brackets 208 may also be provided along the exterior of the cart 10. At least one of these is adapted to receive a seed dispenser (not shown) containing a grass seed and soil mixture adapted for use in repair of divots on the course.

While various embodiments have been described above, it should be understood that they have been presented by way of example only, and not limitation.

INDUSTRIAL APPLICABILITY

The improved and enhanced power-assisted golf bag cart 10 of the present invention is intended for use primarily by golfers who desire the exercise of walking a golf course without the burden of lugging a golf bag and clubs (or the expense of a caddy). The cart 10 is adapted to be ordinarily stored and transported in the storage configuration 16 without a golf bag 12 attached. When the golf course is reached the user loosens the handle pivot lock 72 and pulls the handle 64 upward to extend the frame and to simultaneously extend the rear wheels 42 and 44. The handle pivot lock 72 is tightened again when the handle 64 is in the desired orientation (usually approximately parallel to the ground). The front pivot lock 34 is then loosened and the front wheel is rotated forward and downward until the second position of the discreet rotational positioning 38 is reached, with the front pivot lock knob 36 being tightened to secure the front wheel 26 in operational position. The cart 10 is now in use mode 14.

At this stage it is time to attach the golf bag 12 with its collection of clubs, pockets and accessories. The cart 10 is suited for use with an extremely wide variety of golf bags, from small diameter carry bags to mammoth staff bags. To accommodate the particular selected bag, the golfer pivots the associated grasping arms 96 and 98 outward sufficiently to receive the golf bag. The golf bag 12 may be mounted in whatever orientation the golfer desires since the bag cradle frame 80 is shaped to permit room for belly pockets and the like. Once the bag 12 is positioned within the bag bottom support 92 and the bag top support 94 (resting against the bumpers 99) the tension set screws 102 are adjusted so the grasping arms 96 and 98 relatively firmly capture the bag 12 in place. The elasticity of the grasping arms 96 and 98 causes them to releasably grip the bag 12 in position so that it is not easily dislodged. However, they do allow the golfer to remove the bag and to reinsert it the next time in a snap fit arrangement. The gripping action of the grasping arms 96 and 98 means that no other restraint is necessary on the bag, which adds convenience and speed in setting up and taking down the combination.

Once the bag is installed, the golfer can either manually push the cart 10 or utilize the power assist capability. To activate the power assist, the golfer depresses the On/Off button 126 to activate the electrical circuitry. Pushing to Go/Stop button 128, having first released the manual brake 148, then activates the front wheel motor 108 to propel the golf bag cart 10 in the selected direction. Steering is manually accomplished on the preferred embodiment 10 so the golfer needs to stay with the cart 10, even in power operation, except on straight-aways. However, it is easy to steer even under power. Speed of movement is controlled by the incremental speed up button 130 and slow down button 132 with the selected speed being retained in memory in the power distribution box 116 circuitry as long as the on condition applies (so subsequent "go" commands will operate at the selected speed).

When faced with straight and relatively level conditions, the golfer may wish to boldly abandon contact with the cart 10 and send it off on its own. To do this it is, of course, possible to simply activate the Go button 128 and watch the cart proceed, with the intent of catching up and pushing the button again (Stop button 128 in this case) when the cart 10 reaches the desired location. If more control is desired, however, the preferred method is to utilize one of the distance select buttons. In such a case the golfer may press either the 15 yard button 134, the 30 yard button 136, or the 60 yard button 138 with confidence that the cart 10 will only go approximately the selected distance rather than mindlessly rolling off a distant cliff.

The battery indicator lights 140 provide a constant reminder of the charge capacity condition of the battery 110. It is ordinarily expected that the user will recharge the battery 100 after each use by connecting it to the AC charger 118 and that a full charge will suffice for an entire round of use. However, even with a dead battery 100, the cart 10 may be manually pushed with minimal difficulty.

The front drive motor 108 provides enough force to propel the cart 10 forward over most normal terrain, even when relatively heavily laden. Some additional motive power may be required from the golfer on steep inclines, but this is usually minor. Additionally, the front wheel motor 108 provides inertial braking when on a decline, helping to prevent the cart 10 from getting away from the golfer when going down steep hills. This increases safety and provides a distinct advantage over unpowered carts.

The various accessories are all designed to enhance the golfer's enjoyment, by providing easy access to the tools and implements needed or desired during a typical round of golf. These range form easily accessible tees and golf balls, to conveniently displayed and accessible scorecards and pencil, to relatively secure support of beverage containers. The importance of the upright umbrella holder 188 should also not be discounted, particularly with the increasing emphasis on providing UV protection during outdoor activities. With an umbrella extended and providing shade to the golfer while using the cart 10 the degree of ultraviolet exposure is reduced. Of course, rain protection, hands free, is also desirable at times. Sporadic use accessories include the tire pump 200, the seat bracket 204 and the seed dispenser, all of which may come in handy to the golfer at times.

When the round is over, the process of assembly/set-up is simply reversed and the cart 10 is reconverted to storage mode 16. The battery 110 is recharged and the cart 10 is ready for the next round.

For the above, and other, reasons, it is expected that the golf bag cart system 10 of the present invention will have widespread industrial applicability. Therefore, it is expected that the commercial utility of the present invention will be extensive and long lasting.

What is claimed is:

1. A golf bag cart, adapted to transport a golf bag having a generally tubular elongated shape, comprising
  a support frame;
  a handle attached to said support frame;
  a plurality of wheels depending from said support frame to allow the golf bag cart to be wheeled about;
  a bag bottom support mounted on said support frame to support the bottom of a golf bag;
  a bag cradle frame including a portion of said support frame upon which the golf bag is held in position on said golf bag cart while in use;
  a pair of grasping arms, including a left grasping arm and a right grasping arm, connected to said bag cradle frame, said grasping arms being flexible so as to releasably surround and restrain the golf bag by providing a snap fit about said generally tubular elongated shaped portion of the golf bag; and
  pivot hinges connecting each said grasping arm to said support frame such that said grasping arms may be pivoted to compact storage positions when not in use.

2. A golf bag cart, adapted to transport a golf bag having a generally tubular elongated shape, comprising
  a support frame;
  a handle attached to said support frame;
  a plurality of wheels depending from said support frame to allow the golf bag cart to be wheeled about;
  a bag bottom support mounted on said support frame to support the bottom of a golf bag;
  a bag cradle frame including a portion of said support frame upon which the golf bag is held in position on said golf bag cart while in use;
  a pair of grasping arms, including a left grasping arm and a right grasping arm, connected to said bag cradle frame, said grasping arms being flexible so as to releasably surround and restrain the golf bag by providing a snap fit about said generally tubular elongated shaped portion of the golf bag; and
  a tension set screw associated with each said grasping arm such that the position of each may be empirically adjusted to effectively snap fit about the particular selected golf bag to be used with the golf bag cart.

* * * * *